3,148,422
PRODUCTION OF SHELL MOULDS
John Payne, Buckinghamshire, England, assignor to Monsanto Chemicals Limited, London, England, a British company
No Drawing. Filed July 10, 1962, Ser. No. 208,912
Claims priority, application Great Britain July 20, 1961
11 Claims. (Cl. 22—196)

This invention relates to the production of refractory shell moulds and particularly to the operation in which the wax pattern is removed from a shell mould.

In producing shell moulds for use in metal-casting there is first prepared a wax pattern of the shape that is desired in the final casting. A relatively thin shell of refractory material is then formed on the pattern by coating it with a layer of slurry containing a powdered refractory and allowing the layer to dry; this procedure is usually repeated more than once. The wax pattern then has to be removed from the relatively fragile shell of refractory material, and this represents a difficulty if it is desired to remove the wax by melting and allowing it to run out of the shell before the latter is fired; the wax can then be made use of again in the production of further patterns. The difficulty in this procedure is that unless special precautions are taken, for instance by applying pressure to the outside of the shell to counteract the usual expansion of the wax, the wax pattern expands sufficiently before melting to crack or distort the refractory shell.

An improved process for the production of refractory shell moulds has now been found.

The process of the invention is one for the production of a refractory shell mould, in which a suitable refractory coating, for example, a refractory coating composed of refractory particles and a binder (for instance, a dry or dried binder), is applied to a wax pattern and the whole coated pattern at an initial temperature below the temperature at which the wax pattern expands appreciably, preferably at a temperature of not more than about 50° C., is exposed to an atmosphere of steam under pressure whereby the wax is melted without cracking the shell mould. Generally, most satisfactory results are obtained when the wax pattern is maintained, during and after the application of the refractory coating and prior to treatment with the steam, at a temperature below that at which appreciable expansion of the wax pattern occurs, and preferably at a temperature between 15° and 25° C.

The preparation of the wax pattern and application of the refractory coating can in general follow the procedure that is normally used for these operations in making shell moulds. Thus the wax pattern can conveniently be made of wax such as microcrystalline wax or carnauba wax, and it can for example be produced by injection moulding or by casting under gravity.

The refractory coating is formed from a slurry of a finely-divided refractory material with a binder, preferably a silica-containing binder. A wide range of finely-divided refractory mateiarls can be used, including for example: alumino-silicates such as molochite, sillimanite or mullite; silicon carbide; oxides such as silica, alumina, magnesia or zirconia; silicate such as zircon or forsterite; and various calcined fire-clays such as calcined Ayrshire or Stourbridge clays.

The steam used in the process of the invention is at a pressure above one atmosphere; a pressure between 20 and 150 pounds per square inch gauge, for instance between 50 and 100 pounds per square inch, and particularly about 70 pounds per square inch, is usually suitable. Higher pressures can however be employed if desired.

The temperature of the steam is to some extent dependent on its pressure, but it is not usually necessary to heat the coated pattern to a very high temperature in order to melt the pattern. Usually it is sufficient to employ steam at a temperature between 50° C. higher and 150° C. higher than the melting point of the wax of the pattern. Thus for example, when the pattern is made of microcrystalline wax, for example, one having a melting point of 65° C. or less, a steam temperature between 110° or 120° C. is often suitable. Higher temperatures for example up to 300°, 400°, or 500° C., can be used if desired.

The wax employed in the wax pattern may have a melting point which varies over a rather wide range. Normally, the wax used has a melting point between 50° and 100° C., and the preferred waxes employed have a melting point between about 65° and 80° C. A typical wax used for wax patterns has a melting point of about 65° C.

Before treatment the coated pattern is normally at room temperature, for instance between 15° and 25° C., but it is preferably not at a temperature higher than about 50° C. The coated pattern will often be at about 20° C.

In carrying out the process, the coated pattern in its entirety is placed in an autoclave or other suitable vessel capable of withstanding the steam pressure, and the steam is then injected. Both the outside of the refractory coating and the wax of the pattern are subjected to the steam.

The coated pattern need not be exposed to the steam for more than a few minutes, usually not more than about 10 minutes. About 3 minutes is often sufficient time for melting a wax pattern weighing up to 2 pounds.

If the coated pattern is in an inverted position most of the wax melts and runs out of the mould, usually within a few minutes, but a small portion may remain behind, and this can be removed by heating or firing the shell mould to a high temperature, for example 600° C. to 1000° C. or even more if desired, at which the remaining wax burns. Such heat treatment or firing also has the effect of thoroughly drying the shell mould and causing it to take on a more highly refractory character.

The binder for the refractory is preferably one formed by hydrolysis of a silicate ester, which can be an orthosilicate but in practice is usually a condensed silicate, that is to say a mixture of polysilicates. Good results are obtained using an ethyl silicate or an isopropyl silicate, for example a mixture of silicates prepared by the reaction of silicon tetrachloride with ethyl or isopropyl alcohol containing a small proportion of water. The commercial ethyl silicate sold under the name "Silester OS" ("Silester" is a registered trademark) is particularly useful. Other suitable silicates include for instance isopropyl silicate. In use the silicate is hydrolysed with up to 15% by weight of water, preferably in the presence of an acid catalyst, for instance hydrochloric acid, and a mutual solvent, for instance ethyl or isopropyl alcohol.

The binder can also be an aqueous silica sol, which can suitably be one containing perhaps 15% to 50% of silica by weight. Good results are obtained when the concentration of silica in the sol is within the range of from 20% to 40% by weight, particularly when the concentration is about 30% by weight. The silica sols containing about 30% by weight of silica which are commercially available under the names "Syton" 2X and "Syton" P ("Syton" is a registered trademark) are especially useful.

Normally the binder component of the slurry is caused to gel by the action of a gelation accelerator. In the instance of a hydrolysed silicate ester binder the accelerator can for example be ammonia, or an organic amine such as for instance pyridine, piperidine or dicyclohexylamine. Where the binder is a silica sol the accelerator can be for example calcium carbonate, calcium chloride, sodium carbonate, magnesium oxide, magnesium carbonate, ammonium chloride, hydrochloric acid or sulphuric acid.

The particle size of the refractory filler or material used in preparing the slurry is preferably less than 200 mesh, that is to say, none of the powder is retained on a 200 mesh British Standard Sieve (B.S.S.), and preferably the refractory should contain a significant proportion, for example, perhaps 50 to 75%, of material of particle size less than 300 mesh. The slurry can be prepared simply by mixing the powder refractory filler or material a little at a time with the binder until the slurry formed has a viscosity in the correct range; such a viscosity often corresponds roughly with the consistency of a thin cream. A slurry of suitable viscosity can for example contain between about 30 and about 90 parts of the binder per 100 parts by weight of the refractory filler, depending mainly on the type and state of subdivision of the filler. After the first coating has been applied and gelled further coatings are added, often to a total of for instance six or more.

It is usual to apply the refractory coating in several layers, each layer being put on either by means of a spray or by dipping the pattern into the mixture of refractory material and binder. One end of the pattern or an extension of it is of course left uncoated, so that an open-ended mould is formed.

The process of the invention is illustrated by the following example.

*Example*

The example describes the removal of the wax pattern from a shell mould suitable for casting an impeller for a pump.

A partially hydrolysed solution of ethyl silicate was prepared as follows:

600 cc. of "Silester" OS (a commercial ethyl silicate containing the equivalent of 40 to 42% by weight of silica) were poured slowly with stirring into a mixture of 360 cc. of industrial methylated spirits (containing 6% by weight of water), 40 cc. of water and 1.0 cc. of concentrated hydrochloric acid (specific gravity 1.16). The quantity of water present was about 10% by weight of the ethyl silicate. Stirring was continued for a further 20 minutes and the solution was then allowed to stand for 16 hours.

2000 cc. of sillimanite of particle size less than 200 B.S.S. mesh were added gradually wtih continuous stirring to the hydrolysed solution of ethyl silicate, giving a final slurry having a viscosity of 250 centipoises measured at a shear rate of $50.67^{-1}$ seconds.

A wax pattern of an impeller provided with a length of stout wire to act as a handle was then dipped into the slurry, rotated slowly to ensure a uniform coating and the absence of entrapped air bubbles, and then removed and allowed to drain for 30 seconds. One end of the pattern was left uncoated. A stucco of powdered sillimanite of particle size such that none was retained on a 40 mesh B.S.S. sieve but all was retained on an 80 mesh B.S.S. sieve was then applied to the wet surface as uniformly as possible, its function being partly to provide a key for the second coating of slurry to be applied later. The coated pattern was then transferred to a chamber provided with an open reservoir of concentrated aqueous ammonia (specific gravity 0.880) and rotated slowly in the ammonia-enriched atmosphere for 30 seconds.

At the end of this period the coating had hardened, and a second coating of slurry was then applied. The process was repeated applying alternately stucco and slurry until a total of 6 layers had been built up. After exposure of the final layer to ammonia, the coated pattern was dried in a stream of warm air until excess alcohol and water had been removed, such stream of air being at a temperature such that the temperature of the coated pattern did not exceed 20° C.

The coated pattern at a room temperature of 20° C. was suspended with the open end downwards over a tray in an autoclave at room temperature and subjected to the action of steam at a pressure of 80 pounds per square inch gauge and a temperature of 162° C. After three minutes it was found that almost all of the wax had run out of the coating into the tray and was suitable for re-use. The refractory coating was removed from the autoclave and placed in a furnace at 900° C. for 30 minutes. The resulting shell mould was unbroken and was suitable for use in casting a metal impeller.

For the purpose of comparison, the above procedure was repeated, but with the exception that the coated pattern was treated with steam at atmospheric pressure. The refractory coating broke before the wax pattern had melted.

What I claim is:

1. A process for the production of a refractory shell mould, in which a suitable refractory coating is applied to a wax pattern and the whole coated pattern at an initial temperature of not more than about 50° C. is exposed to an atmosphere of steam under pressure of from about 20 to about 150 pounds per square inch whereby the wax is melted without cracking the shell mould.

2. A process according to claim 1, in which the steam is at a temperature between about 50° C. and 150° C. higher than the melting point of the wax of the pattern.

3. A process according to claim 2, in which the coated pattern is exposed to the steam for a period of not more than about 10 minutes.

4. A process according to claim 3, in which the temperature of the pattern prior to treatment with steam is about 15° C. to about 25° C.

5. A process for the production of a refractory shell mould, in which a wax pattern having a refractory coating composed of refractory particles bonded together with a dried refractory binder is exposed to an atmosphere of steam under pressure of from about 20 to about 150 pounds per square inch and at a temperature sufficient to substantially melt the wax pattern whereby the wax pattern is melted without cracking said refractory coating.

6. A process according to claim 5, in which said refractory coating is formed from a slurry comprising a finely divided refractory material and a silica-containing binder.

7. A process according to claim 5, in which said silica-containing binder is a hydrolysed silicate ester.

8. A process according to claim 5, in which said silica-containing binder is a mixture of polysilicates.

9. A process according to claim 5, in which said silica-containing binder is a hydrolysed ethyl silicate.

10. A process according to claim 5, in which said silica-containing binder is an aqueous silica sol.

11. A process according to claim 5, in which said refractory shell mould is formed on the wax pattern by coating said pattern with a layer of slurry comprising a finely divided refractory material and a silica containing binder followed by the application of a stucco of dry refractory particles and repeating said procedure more than once to form said shell mould.

References Cited in the file of this patent

UNITED STATES PATENTS

| | | |
|---|---|---|
| 1,822,285 | Hagman | Sept. 8, 1931 |
| 2,815,552 | Turnbull et al. | Dec. 10, 1957 |